July 17, 1934.   L. J. SIMON   1,967,161
ADVERTISING SIGN
Filed May 28, 1932

INVENTOR
Louis John Simon
By
ATTORNEY

Patented July 17, 1934

1,967,161

UNITED STATES PATENT OFFICE 1,967,161

ADVERTISING SIGN

Louis John Simon, Herne Hill, London, England

Application May 28, 1932, Serial No. 614,242
In Great Britain June 4, 1931

9 Claims. (Cl. 88—27)

This invention relates to advertising signs and aims to provide an improved device of this character employing a transparent mirror through which pictures, wording or other matter are caused to appear.

According to the invention an improved advertising sign is provided wherein pictures visible through a transparent mirror are projected from a slide on to a screen movable towards and away from said mirror for the purpose of enlarging or reducing the size of the picture projected.

According to the preferred form of the invention, a number of slides are mounted in a movable carrier so that the pictures or other matter on the slides are successively projected on to a translucent screen mounted at the rear of a transparent mirror, the said screen being movable automatically in synchronism with a focusing device for the purpose of producing an enlarging or diminishing effect on the matter projected and visible through the mirror which in the intervals when the slide carrier is moving appears to the observer as an ordinary mirror.

Reference will now be made to the accompanying drawing which illustrates by way of example a construction according to the invention and in which:—

Figure 1:
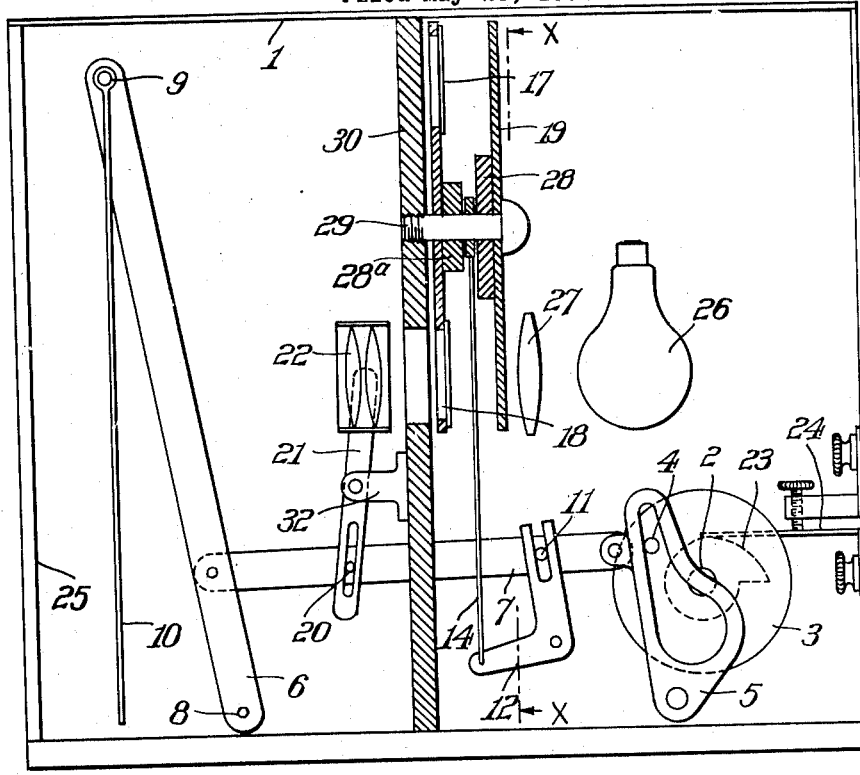
Figure 1 is a sectional elevation of the apparatus.
Figure 2:
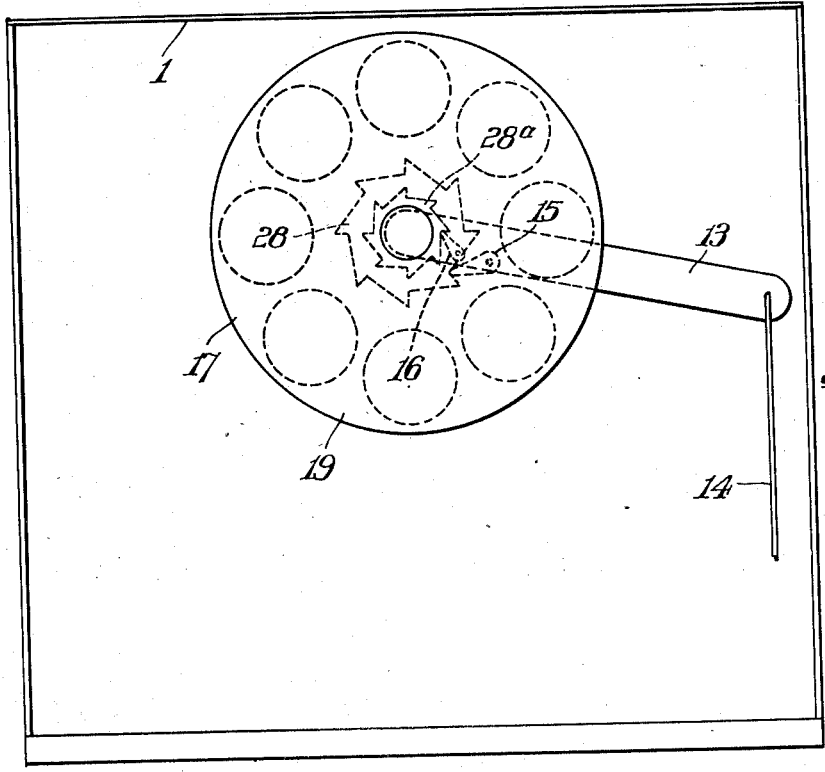
Figure 2 is a cross sectional elevation taken on the line X—X of Figure 1.

In the form illustrated, the apparatus comprises a casing 1 in which is disposed a spindle 2 driven by a spring or electric motor and on which is fixed a plate 3 carrying an eccentric pin 4 adapted to operate a fulcrum lever 5 which is linked to a bar 6 by a rod 7. The bar 6 is coupled to a corresponding bar on the opposite side of the casing by two spindles 8 and 9 and suspended from spindle 9 is a semi-transparent screen 10. The spindle 8 is fixed to the casing 1 and the bars 6 pivot on this spindle 8.

The bar 7 also carries a pin 11 which serves to operate a bell crank lever 12 which in its turn operates a rod 14 pivoted to a lever 13 carrying pawls 15 and 16. Pawl 15 operates a ratchet wheel 28 which intermittently rotates a color screen 19 and pawl 16 operates ratchet wheel 28a which intermittently rotates a slide carrier 17, the slides being shown at 18. The rod 7 also carries a pin 20 which operates a lever 21 to which are attached lenses 22.

Attached to the spindle 2 is a cam 23 to operate a contact or switch 24. At one end of the casing 1 and constituting a wall thereof is a transparent mirror 25. A lamp or light source 26 controlled by the switch 24 is disposed at the rear of the color screen 19 and between this screen and the lamp is disposed a condenser 27. The slide carrier 17 and color screen 19 are mounted on a short spindle 29 fastened to a partition member 30 which also carries a support 32 for the lever 21.

The operation of the apparatus is as follows:—

The advertising matter on the slides 18 is projected on to the screen 10 by light from the lamp 26 passing through condenser 27, color screen 19 and lenses 22. The rotation of the spindle 2 which takes place in an anti-clockwise direction (Fig. 1), by means of pin 4 reciprocates the fulcrum lever 5 which through the rod 7 moves the screen 10 backwards and forwards relatively to the mirror 25 by rocking the bars 6 about the fixed spindle 8.

Owing to the shape of the slot in the fulcrum lever 5, the forward motion of the screen 10 towards the mirror is slow with a slight dwell at the end of this movement whilst the return movement is fast thereby giving the maximum length of time of the whole movement for the forward motion during which the subject matter is projected on the screen.

During the movement of the screen 10, the lenses or focusing device 22 are automatically adjusted to correspond with the change in position of the screen 10 owing to the connection between the rod 7 and the lever 21.

During the return movement of the screen 10 the slide carrier 17 is partially rotated to change the picture or other matter, this occurring whilst the cam 23 is in its inoperative position so that the change of pictures takes place whilst the current is switched off from the lamp 26.

The effect produced by the apparatus above described is that the mirror 25 appears as an ordinary mirror to an observer until the screen 10 commences to approach it at which instant the lamp is switched on. At this time owing to the relative position of the lenses 22 and the screen 10 only a small image appears through the mirror as if in the distance but as the distance between the lenses and screen increases the picture or the like appears to come forward and emerge from the transparent mirror until, when the picture or the like apparently is coextensive with the mirror, the source of light is extinguished and the mirror resumes its normal appearance and function until the cycle of operations above described is repeated.

The function of the color screen 19 is to assist in producing a sharply defined image by masking the chromatism in the lenses.

I claim:—

1. A sign mechanism, comprising a transparent mirror, a screen behind said mirror, means including a focusing device for projecting a subject upon said screen for view through said mirror, said focusing device and screen being relatively movable, means for imparting relative movement to said screen and focusing device, a source of light for said projecting means, and means operative to illuminate said source of light while said focusing means and screen approach one another and to extinguish said source of light at the beginning of the movement of said focusing means and screen away from one another.

2. A sign mechanism, comprising a transparent mirror, a screen behind and movable toward and away from the said mirror, means behind said screen for successively projecting subjects on said screen for view through said mirror, said projecting means including a source of light and a focusing device, said screen and focusing device being relatively movable to vary the size of the subjects projected on said screen, means operative during the movement of said screen in one direction to illuminate said source of light and at the end of such movement to extinguish said source of light, and means for moving said screen and focusing device in synchronism and causing a dwell of said screen and focusing device at the end of said movement of said screen.

3. A sign mechanism, comprising a transparent mirror, a screen mounted behind said mirror for reciprocation relatively to said mirror, a movable picture carrier behind said screen, a condenser behind said picture carrier, a color screen between said picture carrier and condenser, lens means between said picture carrier and first-named screen, said lens means and first-named screen being movable toward and away from one another for varying the size of a picture projected from said picture carrier on said screen as viewed through said mirror, and means for moving said lens means and first-named screen toward and away from one another in synchronism.

4. A sign mechanism according to claim 3 including a source of light for the projecting means, means for illuminating and extinguishing said source of light and timed means for imparting relative movement to the first-named screen and lens means, actuating the picture carrier, and actuating the means for illuminating and extinguishing said source of light.

5. A sign mechanism comprising a light source, a transparent mirror, a screen of light pervious material disposed behind said mirror, a movable picture carrier disposed between said screen and said light source, a picture focusing device between said picture carrier and screen, said picture focusing device and screen being movable toward and away from one another in synchronism, means for intermittently moving said picture carrier, and means for extinguishing said light source during the movements of the picture carrier.

6. A sign mechanism comprising a transparent mirror, a light source, a screen mounted between said light source and mirror for movement toward and away from said mirror, means including a focusing device movable in synchronism with said screen toward and away from the latter for projecting a picture onto said screen during its said movement in one direction to render such picture visible through said mirror and means for extinguishing the light source during movement of the screen in the opposite direction.

7. A sign mechanism comprising a light source, a transparent mirror, a screen of light pervious material disposed behind said mirror to receive the projection of a subject, means for reciprocating said screen toward and away from said mirror, a rotary picture carrier disposed between said screen and said light source, a picture focusing device movable toward and away from the screen in synchronism with the screen, and means for extinguishing the light source during the movements of the picture carrier.

8. A sign mechanism comprising a light source, a transparent mirror, a translucent screen mounted behind said mirror for movement toward and away from the latter means for successively projecting a number of subjects onto said screen, said projecting means including a focusing device movable relatively to said screen, means for moving said screen and focusing device in synchronism during projection to vary the size effect of the subjects as viewed in said mirror, and means for extinguishing the light source during changing of the subjects.

9. A sign mechanism according to claim 7 including a condenser disposed between the light source and the picture carrier, and a color screen disposed between the condenser and the picture carrier.

LOUIS JOHN SIMON.